(12) United States Patent
Min et al.

(10) Patent No.: US 8,473,548 B2
(45) Date of Patent: Jun. 25, 2013

(54) INTELLIGENT NETWORK SYSTEM AND METHOD AND COMPUTER-READABLE MEDIUM CONTROLLING THE SAME

(75) Inventors: Seung Ki Min, Suwon-si (KR); Woo Sup Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 242 days.

(21) Appl. No.: 12/889,080

(22) Filed: Sep. 23, 2010

(65) Prior Publication Data

US 2011/0078235 A1 Mar. 31, 2011

(30) Foreign Application Priority Data

Sep. 25, 2009 (KR) .................. 10-2009-0091263

(51) Int. Cl.
*G06F 15/16* (2006.01)
(52) U.S. Cl.
USPC ........... 709/203; 709/217; 709/224; 709/226; 709/248; 714/4.12
(58) Field of Classification Search
USPC ................. 709/203, 223–224, 232, 248, 217, 709/226; 714/2, 4.11, 4.12
See application file for complete search history.

(56) References Cited

U.S. PATENT DOCUMENTS

| | | | |
|---|---|---|---|
| 6,571,280 B1* | 5/2003 | Hubacher | 709/217 |
| 6,959,331 B1* | 10/2005 | Traversat et al. | 709/222 |
| 2001/0056554 A1* | 12/2001 | Chrabaszcz | 714/13 |
| 2002/0120694 A1* | 8/2002 | Bantz et al. | 709/206 |
| 2002/0133601 A1* | 9/2002 | Kennamer et al. | 709/229 |
| 2002/0198996 A1* | 12/2002 | Sreenivasan et al. | 709/226 |
| 2003/0120772 A1* | 6/2003 | Husain et al. | 709/224 |
| 2003/0233648 A1* | 12/2003 | Earl et al. | 717/176 |
| 2004/0153709 A1* | 8/2004 | Burton-Krahn | 714/4 |
| 2008/0114872 A1* | 5/2008 | Fisher et al. | 709/224 |
| 2008/0320259 A1* | 12/2008 | Garg et al. | 711/162 |
| 2009/0119306 A1* | 5/2009 | Garbow et al. | 707/10 |
| 2011/0066672 A1* | 3/2011 | Zamarreno et al. | 709/203 |

* cited by examiner

*Primary Examiner* — Oanh Duong
(74) *Attorney, Agent, or Firm* — Staas & Halsey LLP (57) ABSTRACT

An intelligent network system including a client unit and a server unit providing a service to the client unit, and a method and computer-readable medium controlling the same are disclosed. If the server unit copies a process that performs a service requested by the client unit into the client unit, and the server unit cannot provide the service any longer, the process is copied to another available server unit so that the service can be continuously provided. Also, if there is no available server unit, the client unit receives the service using the copy process pre-stored in the client unit itself. Therefore, although the network or the peripheral device is in the worst state, the client unit can stably receive the service.

12 Claims, 7 Drawing Sheets

INTELLIGENT NETWORK SYSTEM AND METHOD AND COMPUTER-READABLE MEDIUM CONTROLLING THE SAME

CROSS-REFERENCE TO RELATED APPLICATIONS

This application claims the benefit of Korean Patent Application No. 2009-0091263, filed on Sep. 25, 2009 in the Korean Intellectual Property Office, the disclosure of which is incorporated herein by reference.

BACKGROUND

1. Field

Example embodiments relate to an intelligent network system wherein a client unit and a server unit are connected to each other over a network. The network may stably provide a service to the client unit even if the server unit that is providing the service to the client unit does not provide the service any longer.

2. Description of the Related Art

Generally, in a component-based software architecture, communication between components is of importance to overall system stability and performance.

A conventional method of dealing with a malfunction and improving performance of the component-based software architecture including a plurality of service providers, each of which provides the service to the service consumer, may include allowing the service providers to manually prepare for such malfunction.

For example, while the service consumer of the client unit receives the service from the service provider of the first unit in an intelligent network system including a client unit and a server unit networked to the client unit, if an unexpected problem occurs between the client unit and the first server unit, if a problem occurs in the first server unit, or if a problem occurs in the process that executes the service in the first server unit, the intelligent network system can allow a corresponding server unit to continuously provide the service using the copy process that pre-stores respective service providers in different server units. In other words, the copy processes are respectively pre-stored in several server units, so that the server units can stably provide the service without any problems.

However, in order to prepare for a malfunction of the server unit that is currently providing the service, the above-mentioned method has a disadvantage because the copy process must be pre-stored in each available server unit for dealing with any malfunction of the server unit currently providing the service. If the number of such server units is considerably high, the copy processes must be pre-stored in many server units to solve such a malfunction, resulting in greater inconvenience of use. If any one of the server units does not have a copy process, it is impossible to guarantee a persistent service and stability. Furthermore, although one client unit is disconnected from all networks and the remaining server units can be made available, it is impossible for the remaining server units to receive any services.

SUMMARY

Therefore, it is an aspect of example embodiments to provide an intelligent network system that enables a client unit to more effectively receive a normal service even if a server unit capable of providing a service to the client unit cannot provide the service any longer, and a method and computer-readable medium controlling the intelligent network system.

The foregoing and/or other aspects are achieved by providing an intelligent network system including a client unit, and a first server unit and a second server unit connected to the client unit over a network. The first server unit executes a process that executes a service upon receiving a request from the client unit and provides the service. The client unit receives the service from the first server unit, copies the process of the first server unit and stores the copied process, provides the copied process to the second server unit if the first server unit does not provide the service, and requests the service from the second server unit. The second server unit stores a process received from the client unit, executes the process upon receiving a request from the client unit, and provides the service.

The client unit may include a service consumer receiving a service from one of the first server unit and the second server unit, a copy manager requesting the first server unit to copy the process, receiving the copied process from the first server unit, and providing the copied process to the second server unit as necessary, a copy storage unit storing the copied process by the copy manager, and an interface unit interfacing with the one of first server unit and the second server unit.

The first server unit may include a service provider providing a service to the service consumer, a copy manager copying the process and transmitting the copied process to the copy manager of the client unit, and an interface unit interfacing with the client unit.

The second server unit may include a service provider providing a service to the service consumer, a copy manager receiving the copied process from the copy manager of the client unit, and executing the received process, and an interface unit interfacing with the client unit.

If a plurality of potential second server units is present, the client unit may check a load of each second server unit, and determine one server unit having a smallest load from among the plurality of potential second server units to be the second server unit.

The foregoing and/or other aspects are achieved by providing an intelligent network system including a client unit, and a server unit connected to the client unit over a network, wherein the server unit executes a process that executes a service upon receiving a request from the client unit and provides the service, and the client unit receives the service from the server unit, copies the process of the server unit and stores the copied process, executes the copied process if the server unit does not provide the service, and receives the service from the client unit.

The client unit may include a service consumer receiving a service from the server unit, and commanding execution of the copied process if the service unit does not provide the service, a copy manager requesting the server unit to copy the process and receiving the copied process, and executing the copied process upon receiving a command from the service consumer, a copy storage unit storing the copied process by the copy manager, and an interface unit interfacing with the server unit.

The server unit may include a service provider providing a service to the service consumer, a copy manager copying the process and transmitting the copied process to the copy manager of the client unit, and an interface unit interfacing with the client unit.

The foregoing and/or other aspects are achieved by providing a method of controlling an intelligent network system including a client unit and a server unit connected to the client unit over a network including, copying a process of performing the service in the client unit, and storing the copied process in the client unit if the client unit receives a service from the server unit, and providing the service to the client unit using the process stored in the client unit if the server unit does not provide the service.

The method may further include, determining, by the client unit, whether a different available server unit connected to the network is absent or present if the server unit does not provide the service, and providing the process to the different server unit to allow the different server unit to provide the service if the different available server unit is determined to be present.

The client unit may select a server unit having a smallest load from among the plurality of server units, and transmit the process to the selected server unit if plural different server units are present.

The method may further include, executing, by the client unit, the stored process to provide the service to the client unit if the different available server unit is determined to be absent.

The foregoing and/or other aspects are achieved by providing at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
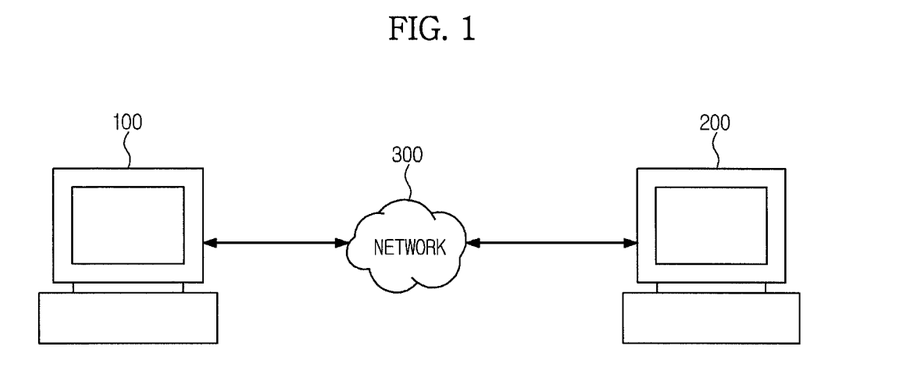
FIG. 1 is a conceptual diagram illustrating an intelligent network system according to example embodiments.
Figure 2:
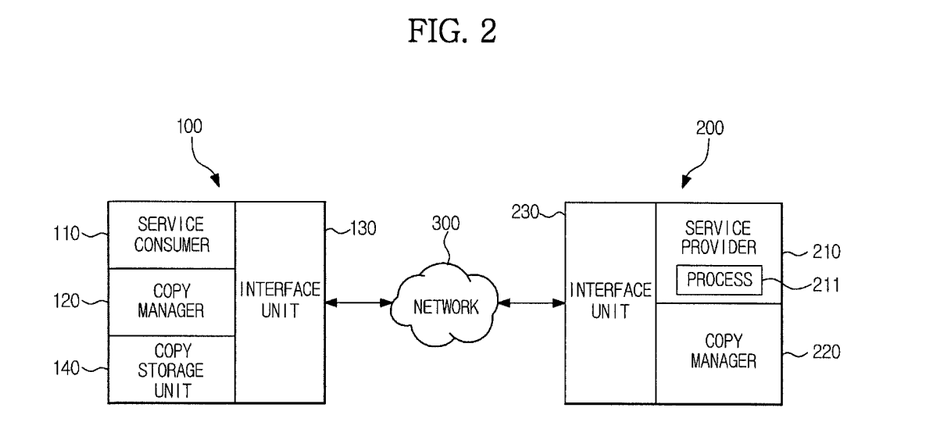
FIG. 2 is a control block diagram illustrating a client unit and a server unit in an intelligent network system according to example embodiments.

FIG. 1 is a conceptual diagram illustrating an intelligent network system according to example embodiments. FIG. 2 is a control block diagram illustrating a client unit and a server unit in the intelligent network system shown in FIG. 1 according to example embodiments.

Referring to FIG. 1, in the intelligent network system according to example embodiments, a client unit 100 and a server unit 200 are connected over a network.

The client unit 100 and the server unit 200 each may include the following which are not shown: a Central Processing Unit (CPU), a memory, an input unit (e.g., a keyboard and a pointing device), an output unit (e.g., a display), and a copy storage unit (e.g., a disc drive). Each of the memory and the storage unit is a computer-readable medium that includes commands to implement a generation system. In addition, data structures and message structures may be stored or transmitted through a data transmission medium such as a signal applied to a communication link. A variety of communication links may be used, for example, the Internet, a Local Area Network (LAN), a Wireless Area Network (WAN), and a point-to-point telephone line connection.

The client unit 100 may include a variety of computing devices, for example, a Personal Digital Assistant (PDA), a mobile phone, a personal computer (PC), and the like.

An appropriate operation management environment where the above-mentioned intelligent network system can be implemented is shown in FIG. 1. A variety of operation management environments may include a personal computer (PC), a server, a pocket or laptop computer, a multi-processor system, a microprocessor-based system, a programmable household electronic appliance, a network system, a mini computer, a main-frame computer, and a distributed computing environment including systems or devices.

Referring to FIG. 2, the client unit 100 may include a service consumer 110, a copy manager 120, an interface unit 130, and a copy storage unit 140.

The server unit 200 may include a service provider 210, a copy manager 220, and an interface unit 230. Also, the server unit 200 may further include a copy storage unit.

The service consumer 110 of the client unit 100 requests a service from the service provider 210 of the service unit 200 and receives the execution result of the service provided from the service provider 210 in response to the service request.

The copy manager 120 of the client unit 100 receives a copy command from the service consumer 110, and requests that the copy manager 220 of the server unit 200 copy the process 211. The copy manager 120 of the client unit 100 receives a copy process 141 of the process 211 from the copy manager 220 of the server unit 200, and stores the received copy process 141 in the copy storage unit 140. Also, the copy manager 120 executes the copy process 141 stored in the copy storage unit 140 as necessary.

The interface unit 130 of the client unit 100 interfaces with the server unit 200 over the network.

The copy storage unit 140 of the client unit 100 stores the copy process received from the copy manager 120.

The service provider 210 of the server unit 200 executes the service requested by the service consumer 110 of the client unit 100, and transmits the executed result to the service consumer 110 of the client unit 100.

The copy manager 220 of the server unit 200 receives the process copy request from the copy manager 120 of the client unit 100, copies the process 211 of the service provider 210, and provides the copy process 141 of the process 211 to the copy manager 120 of the client unit 100.

The interface unit 230 of the server unit 200 interfaces with the client unit 100 over the network.

The service provider 210 of the server unit 200 provides a variety of services such as a complicated calculation to the service consumer 110 of the client unit 100.

The service consumer 110 of the client unit 100 or the service provider 210 of the server unit 200 may be a program module based on a computer-executable command. In general, the program module may include a routine, a program, an object, a component, and a data structure, each of which performs a specific task or implements a specific abstract type.

Figure 3:
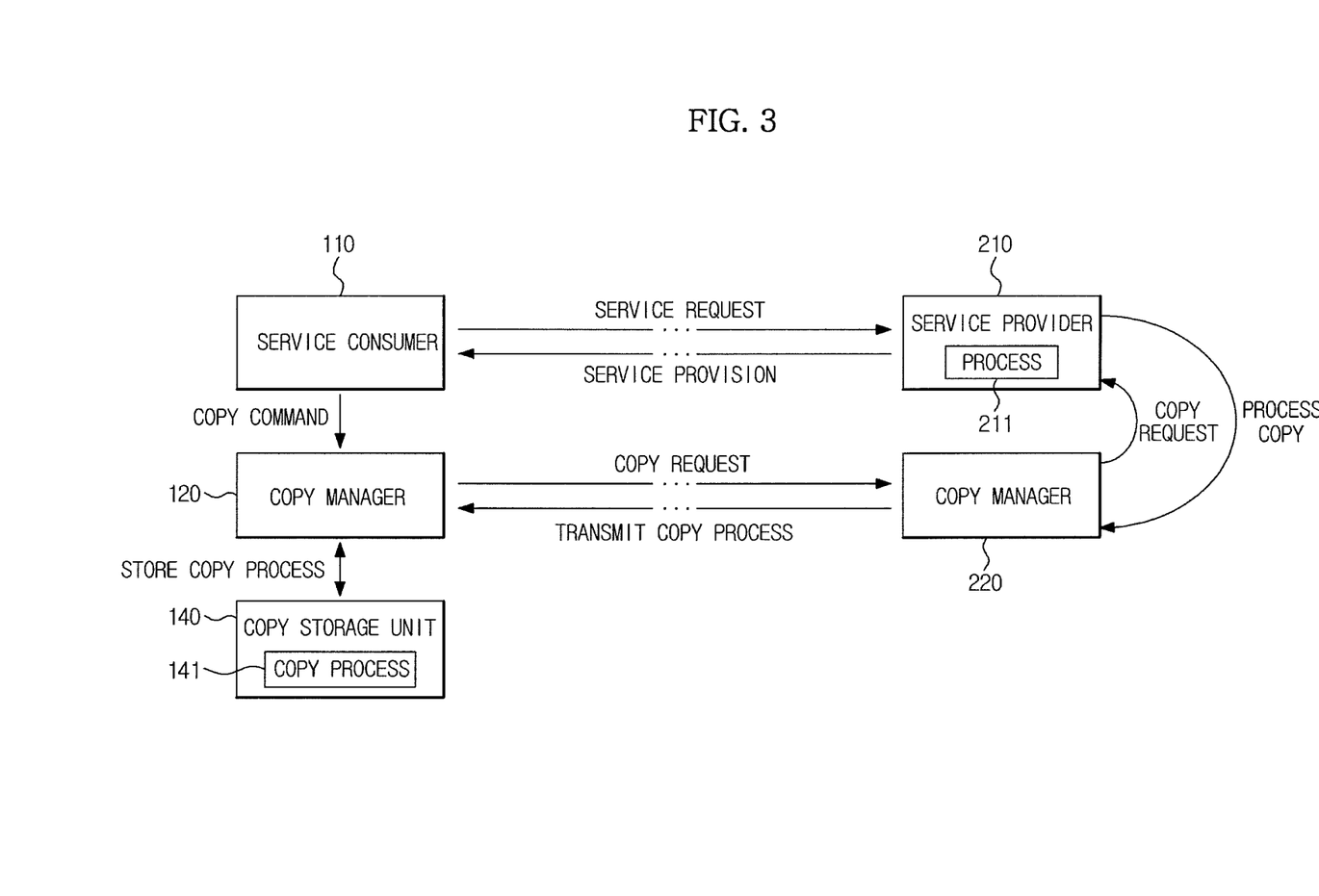
FIG. 3 is a conceptual diagram illustrating a method of allowing the client unit shown in FIG. 2 to copy and store a process of a server unit according to example embodiments.

FIG. 3 is a conceptual diagram illustrating a method of allowing the client unit shown in FIG. 2 to copy and store a process of the server unit according to example embodiments.

Referring to FIG. 3, when the client unit 100 receives and executes the service from the server unit 200, the client unit 100 copies the process 211, and copies the copy process 141 of the process 211 in the copy storage unit 140 of the client unit 100. In this case, the copying is carried out by an additional thread having a low priority which causes no excessive load to a system.

In more detail, if the client unit 100 is normally connected to the server unit 200 over a network, the service consumer 110 of the client unit 100 requests the service from the service provider 210 of the server unit 200, and receives the service execution result from the service provider 210 in response to the request. In this case, the service consumer 110 of the client unit 100 commands the copy manager 120 to copy the process. The copy manager 120 requests that the copy manager 220 of the server unit 200 copy the process. The copy manager 220 of the server unit 200 receives the request of copying the process, copies the process 211 of the service provider 210, and transmits the copied process 211 to the copy manager 120 of the client unit 100 through the interface unit 130. The copy manager 120 of the client unit 100 receives the copy process 141 through the interface unit 130, and stores the received process 141 in the copy storage unit 140.

Figure 4:
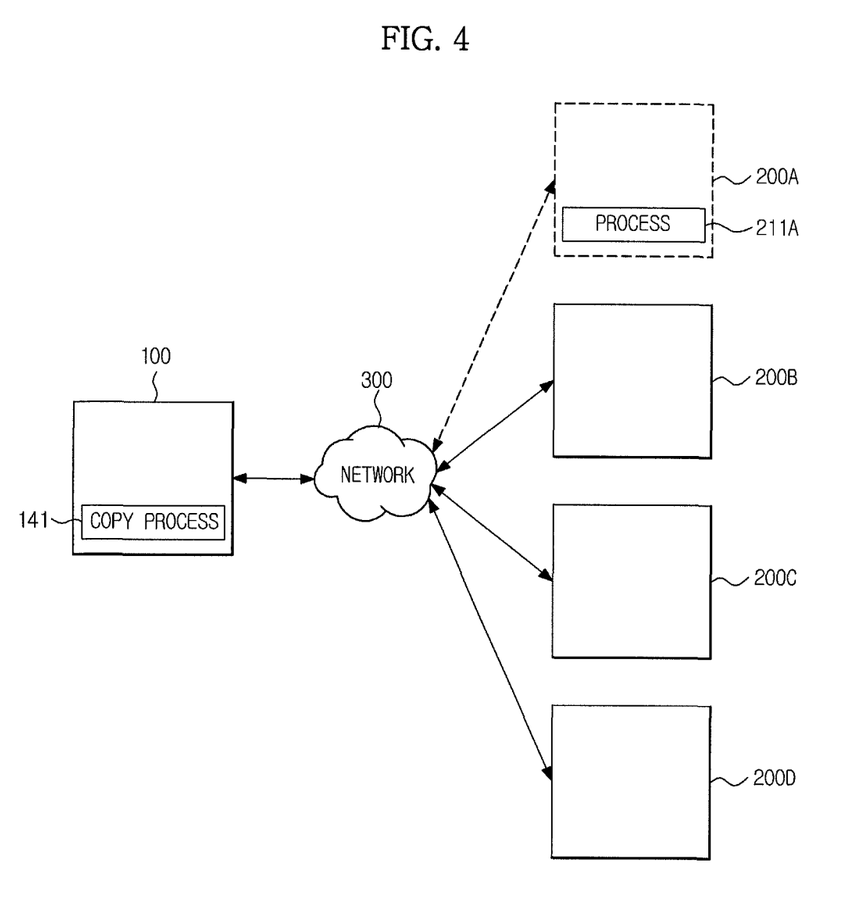
FIG. 4 is a conceptual diagram illustrating a scanning process carried out when the server unit providing a service to the client unit in the intelligent network system does not provide the service any longer according to example embodiments.
Figure 5:
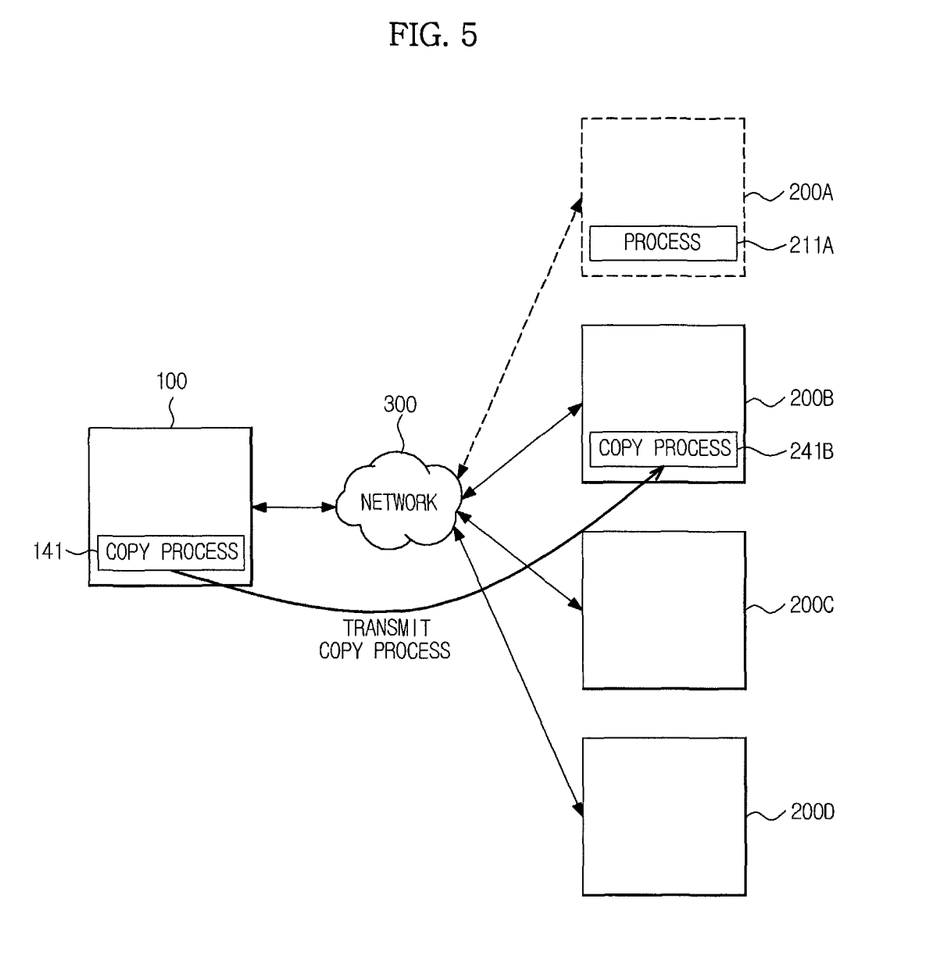
FIG. 5 is a conceptual diagram illustrating a method of allowing the client unit of the intelligent network system to transmit a copied process to an appropriate server unit connected to a network according to example embodiments.
Figure 6:
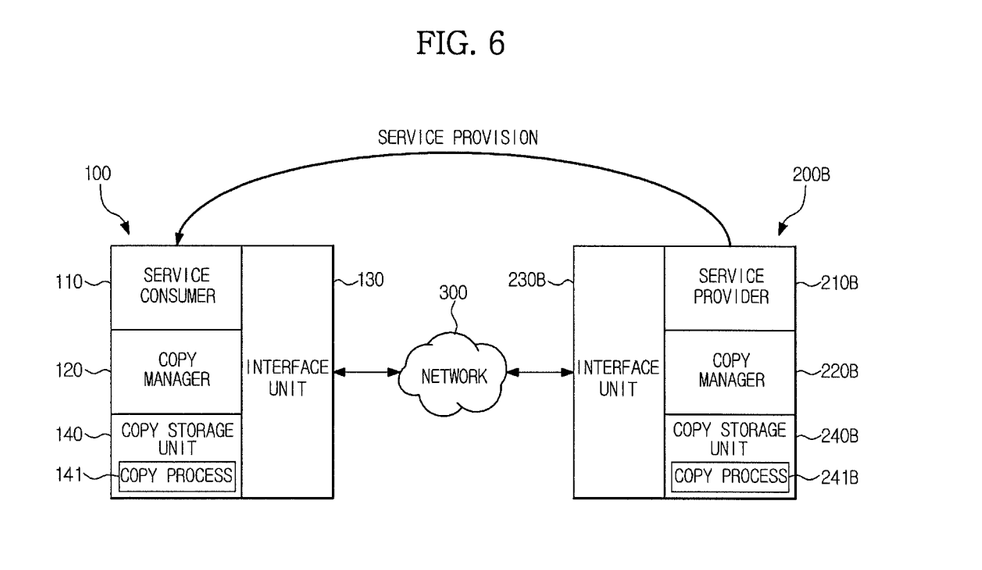
FIG. 6 is a conceptual diagram illustrating a method of allowing the server unit receiving the copied process in the intelligent network system to provide a normal service to the client unit according to example embodiments.

FIG. 4 is a conceptual diagram illustrating a method of scanning the server unit 200 that transmits a copy process when the server unit 200 providing a service to the client unit 100 in the intelligent network system does not provide the service any longer according to example embodiments. FIG. 5 is a conceptual diagram illustrating a method of allowing the client unit 100 of the intelligent network system to transmit a copied process to an appropriate server unit connected to a network according to example embodiments. FIG. 6 is a conceptual diagram illustrating a method of allowing the server unit receiving a copied process in the intelligent network system to execute the copied process and provide a normal service to the client unit according to example embodiments.

Referring to FIG. 4, if the client unit 100 has difficulty in receiving a service due to a variety of problems, for example, one of disconnection from the network 300, failure of the server unit 200, and a faulty process, the client unit 100 scans an available server unit from among several server units 200 contained in the entire system.

Under the condition that N server units 200A to 200N are connected to the client unit 100 over the network, if the first server unit 200A providing the service to the client unit 100 cannot provide the service any longer, the first server unit 200A is replaced with the copy process 141 provided from any of the remaining server units 200B to 200N. The most appropriate server unit 200 capable of providing the service is scanned instead of the first server unit 200A.

For example, the most appropriate server unit 200 may have the smallest load. When the copy manager 120 of the client unit 100 asks the copy manager 220 of each of the server units 200B to 200N to analyze load, and receives the result of analyzing each load from the copy manager 220, a load status of each of the server units 200B to 200N can be recognized. Each of the server units 200A to 200N provides the service needed for the copy process through the copy manager 120, and periodically provides the load of a current system to the copy manager 120 of the client unit 100.

Referring to FIG. 5, if one server unit 200B having the smallest load is selected from among the server units 200B to 200N, the client unit 100 transmits the copy process 241B of the copy process 141 stored in the copy storage unit 140 to the server unit 200B, and stores it in copy storage unit 240B the server unit 200B. If the smallest-load server unit from among the server units 200B to 200N is a third server unit 200C, the copy process 241C of the copy process 141 is copied in the third server unit 200C.

Referring to FIG. 6, the copy manager 220B of the server unit 200B receives the copy process 241B of the copy process 141, and executes the received copy process 241B. The service consumer 110 of the client unit 100 again stably receives the service from the service provider 210 of the server unit 200B.

In other words, if the service consumer 110 of the client unit 100 requests the service, the service provider 210B of the second server unit 220B executes the copy process 241B stored in the copy storage unit 240B through the copy manager 220B to perform the service, and provides the service execution result to the service consumer 110 of the client unit 100. Therefore, the client unit 100 can again stably receive the service from the second server unit 200B although the first server unit 200A does not provide the service.

The server units 200B to 200N are capable of providing the service to the client unit 100. When the server units 200B to 200N are not present or all networks 300 are severed, the copy process 141 stored in the copy storage unit 140 of the client unit 100 is executed by the client unit 100, and a local service is continuously performed. Therefore, although the network 300 or the peripheral machine is in the worst state, the service consumer 110 of the client unit 100 can still continuously receive the local service. Accordingly, the service consumer 110 of the client unit 100 can continuously receive the service without any malfunction or stoppage.

Figure 7:
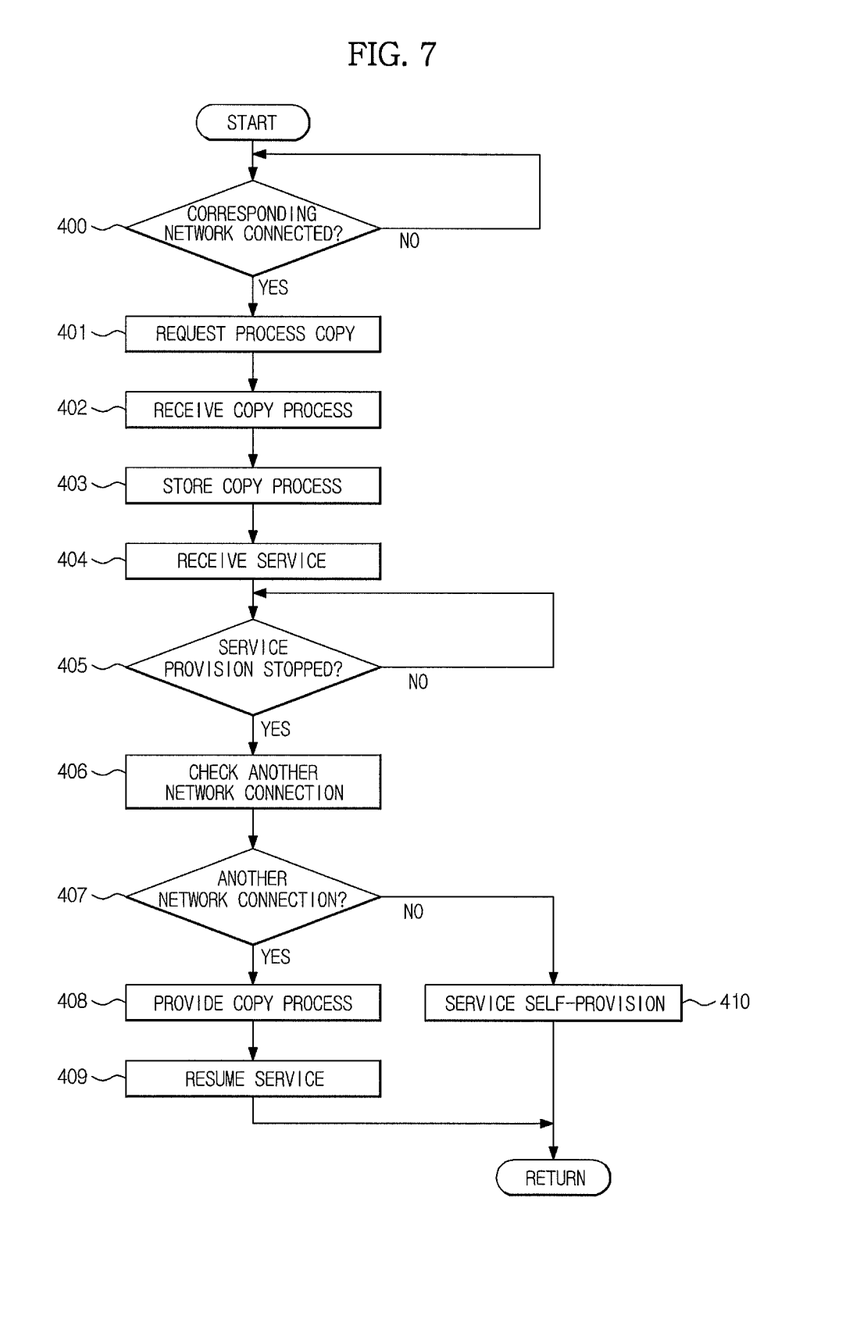
FIG. 7 is a flowchart illustrating a method of controlling an intelligent network system according to example embodiments.

FIG. 7 is a flowchart illustrating a method of controlling an intelligent network system according to example embodiments.

Referring to FIG. 7, the service consumer 110 of the client unit 100 determines whether the server unit 200 providing the service is connected to the network at operation 400.

If the corresponding server unit 200 is connected to the client unit 100 over the network, the service consumer 110 asks the server unit 200 to copy the process of performing the service via the copy manager 120 at operation 401. Therefore, the copy manager 220 of the server unit 200 copies a corresponding process, and transmits the copied process to the copy manager 120 of the client unit 100.

The copy manager 120 of the client unit 100 receives the copy process received from the server unit 200 at operation 402.

The copy manager 120 of the client unit 100 stores the received copy process in the copy storage unit 140 at operation 403.

Thereafter, the service consumer 110 of the client unit 100 requests the service from the service provider 210 of the server unit 200, and receives the result of the service executed by the service provider 210 in response to the request at operation 404.

It is determined whether the service provision is stopped at operation 405 due to network disconnection or process failure while the service consumer 110 of the client unit 100 receives the service from the service provider 210 of the server unit 200.

If the service provision is stopped, the service consumer 110 of the client unit 100 confirms a network connection state to recognize the presence or absence of another available network connection at operation 406.

After confirming the network connection state at operation 406, it is determined whether there is another available network connection connected to the server unit 200 at operation 407. For example, the first server unit 200A provides the service to the client unit 100 under the condition that N server units 200 are connected to the client unit 100 over the network. In this case, if the first server unit 200A does not provide the service to the client unit 100 any longer, the first server unit 200A receives the copy process from any one of the remaining server units (i.e., server units from the server unit 200B to 200N), and the server unit 200 capable of providing the service on behalf of the first server unit 200A is scanned. In this case, the server unit 200 may have the smallest load. If the copy manager 120 of the client unit 100 asks the copy manager 220 of each server unit 200 to analyze the load and receives the analysis result of each load, it is possible to recognize a load state of each server unit 200.

If another network connection is present, the copy manager 120 of the client unit 100 provides the copy process stored in the copy storage unit 140 to the server unit 200 connected to the network at operation 408. Therefore, the copy manager 220 of the server unit 200 receives the copy process and stores the received copy process in the copy storage unit 240.

Thereafter, the service consumer 110 of the client unit 100 requests the service from the service provider 210 of the server unit 200. Upon receiving the request of the service consumer 110, the service provider 210 executes the copy process stored in the copy storage unit 240 through the copy manager 220, and provides the service execution result to the service consumer 110 of the client unit 100, to resume the service at operation 409. Therefore, the client unit 100 can again stably receive the service.

In the meantime, if an available server unit 200 capable of providing the service is not present or all networks are severed so that there is no network connection at operation 407, the service consumer 110 of the client unit 100 executes the copy process stored in the copy storage unit 140 through the copy manager 120 in order to receive the service. Accordingly, the client unit 100 can continuously guarantee the service without any malfunction or stoppage.

As is apparent from the above description, when the client unit is connected to the server unit over a network, if it is assumed that a service provider of the server unit copies a process that is provided to a service consumer of the client unit, into the client unit, and the server unit cannot normally provide a service to the client unit due to network failure or a faulty process of the server unit, the server unit copies the copied process to a different server unit connected to the client unit over a network, and restarts the service, such that the service consumer of the client unit can stably receive the service. Therefore, example embodiments can be effectively applied to a component-based software architecture expected as the next promising technology, and can largely solve shortcomings of the component-based software architecture. In addition, for software architectures of all products that are needed and are networked, a high-strength and high-performance product can be constructed.

Also, if it is assumed that there is no available server unit capable of providing a service to the client unit or all networks are severed, the client unit may execute a copy process stored in the client unit itself to continuously execute a local service. Even if a network or a peripheral device is in the worst condition, a service consumer of the client unit can continuously receive the service. As a result, the client unit can continuously guarantee the service without causing a malfunction in a network system or without stopping operations of the network system.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. An intelligent network system, comprising:
    a client unit; and
    a first server unit and a second server unit connected to the client unit over a network,
    wherein the first server unit executes a process that executes a service upon receiving a first request from the client unit and provides the service,
    the client unit receives the service from the first server unit, copies the process of the first server unit and stores the copied process, provides the copied process to the second server unit if the first server unit does not provide the service, and transmits a second request for the service to the second server unit, and
    the second server unit stores the copied process received from the client unit, executes the copied process upon receiving the second request from the client unit, and provides the service.

2. The intelligent network system according to claim 1, wherein the client unit includes:
    a service consumer receiving the service from one of the first server unit and the second server unit;
    a copy manager requesting the first server unit to copy the process, receiving the copied process from the first server unit, and providing the copied process to the second server unit as necessary;
a copy storage unit storing the copied process through the copy manager; and
an interface unit interfacing with one of the first server unit and the second server unit.

3. The intelligent network system according to claim 2, wherein the first server unit includes:
a service provider providing the service to the service consumer;
a copy manager copying the process and transmitting the copied process to the copy manager of the client unit; and
an interface unit interfacing with the client unit.

4. The intelligent network system according to claim 2, wherein the second server unit includes:
a service provider providing the service to the service consumer;
a copy manager receiving the copied process from the copy manager of the client unit, and executing the received process; and
an interface unit interfacing with the client unit.

5. The intelligent network system according to claim 1, wherein, if a plurality of potential second server units is present, the client unit checks a load of each potential second server unit, and determines one server unit having a smallest load from among the plurality of potential second server units to be the second server unit.

6. The intelligent network system according to claim 1, wherein when the second server unit does not provide the service, the client unit executes the copied process.

7. The intelligent network system according to claim 6, wherein the client unit includes:
a service consumer receiving the service from the first or second server unit, and commanding execution of the copied process if both the first and second service units do not provide the service;
a copy manager requesting the first or second server unit to copy the process and receiving the copied process, and executing the copied process upon receiving a command from the service consumer;
a copy storage unit storing the copied process using the copy manager; and
an interface unit interfacing with the first or second server unit.

8. The intelligent network system according to claim 7, wherein each of the first and second server units includes:
a service provider providing the service to the service consumer;
a copy manager copying the process and transmitting the copied process to the copy manager of the client unit; and
an interface unit interfacing with the client unit.

9. A method of controlling an intelligent network system including a client unit and a server unit connected to the client unit over a network, the method comprising:
copying, by the server unit, a process, the server unit executing the process providing a service to the client unit;
transmitting, by the server unit, the copied process to the client unit;
receiving and storing, by the client unit, the copied process;
providing, by the client unit, the copied process to a different available server unit if the server unit is out of order; and
executing the copied process by the different available server unit that receives the copied process from the client unit to provide the service to the client unit.

10. The method according to claim 9, wherein, the client unit selects a server unit having a smallest load from among a plurality of server units, and transmits the process to the selected server unit if plural different available server units are present.

11. The method according to claim 9, the method further comprises executing, by the client unit, the copied process when the different available server unit is out of order in order to allow the client unit to provide the service.

12. At least one non-transitory computer readable medium comprising computer readable instructions that control at least one processor to implement the method comprising:
copying, by a server unit, a process, the server unit executing the process providing a service to the client unit;
transmitting, by the server unit, the copied process to a client unit;
receiving and storing, by the client unit, the copied process;
providing, by the client unit, the copied process to a different available server unit if the server unit is out of order; and
executing the copied process by the different available server unit that receives the copied process from the client unit to provide the service to the client unit.

* * * * *